United States Patent [19]
Wuttke

[11] 3,884,723
[45] May 20, 1975

[54] BUTTON TYPE GALVANIC CELL
[75] Inventor: Klaus Guenther Wuttke, Wilmington, Del.
[73] Assignee: E. I. du Pont de Nemours & Company, Wilmington, Del.
[22] Filed: Oct. 12, 1973
[21] Appl. No.: 405,806

[52] U.S. Cl. ................ 136/111; 136/107; 136/135
[51] Int. Cl. ............................................ H01m 1/02
[58] Field of Search ............ 136/111, 107, 135, 6 B

[56] References Cited
UNITED STATES PATENTS
| | | | |
|---|---|---|---|
| 1,644,344 | 10/1927 | Martus et al. | 136/107 |
| 2,990,442 | 6/1961 | Barnett | 136/111 X |
| 3,250,645 | 5/1966 | Zahn et al. | 136/111 X |
| 3,542,601 | 11/1970 | Gabano | 136/155 |
| 3,660,167 | 5/1972 | Ching et al. | 136/107 |

OTHER PUBLICATIONS
High Energy System (Organic Electrolyte) Buhner H. R., The Electric Storage Battery Co., Yardley, Penn.

Primary Examiner—Winston A. Douglas
Assistant Examiner—John F. Niebling
Attorney, Agent, or Firm—James A. Costello

[57] ABSTRACT

Disclosed herein is an improvement in a button type galvanic cell comprising a conductive container, a conductive top for the container that is insulated therefrom, an anode electrode, a cathode electrode, at least one separator, and an electrolyte, the cell having a generally flat relatively thin configuration; the improvement comprising one electrode being of flat configuration presenting two flat sides and being encased on its two flat sides by a porous nonconductive separator and by the other electrode, the other electrode and the separator each containing at least one aperture in the same relative location(s) through which contact is made between the encased electrode and either the conductive container or the conductive top by means of at least one protuberance from the container or the top, there being no contact between the protuberance(s) and the electrode through which it passes.

8 Claims, 15 Drawing Figures

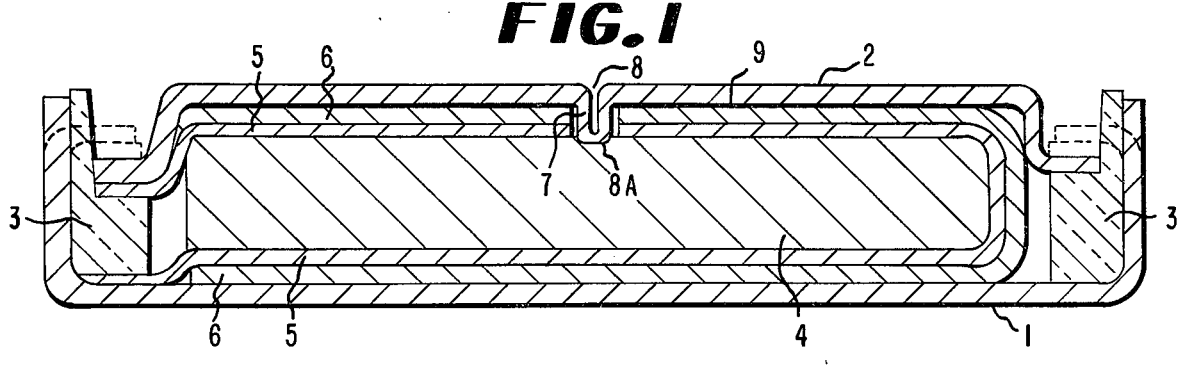
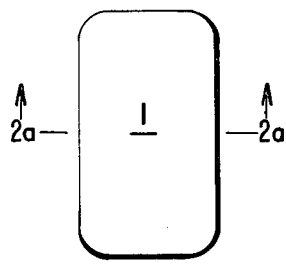
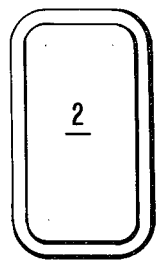
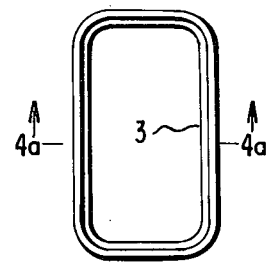
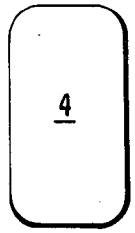
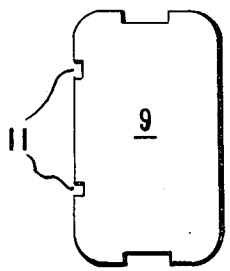

BUTTON TYPE GALVANIC CELL

DESCRIPTION OF THE PRIOR ART

In the galvanic cell art colloquial names have been given to many of the various shapes and sizes of cells and batteries. The name "button cell" is attached to small, but not necessarily disc-shaped cells that have a diameter normally greater than their height and that have a broad range of capacities, generally from about 2 milliampere hours to 2,000 milliampere hours. A number of electrochemical couples have been employed in button cell assemblies, notably the mercuric oxide-zinc couple and the nickel-cadmium couple. Button cells have wide use in hearing aids, watches, miniature radios, light meters, instruments, and the like.

Recently developed button type cells of high energy density employ non-aqueous electrolytes and light metal (usually lithium) anodes. Button cells usually comprise one cathode and one anode of thin, flat configuration disposed in horizontally congruent relationship and separated by a nonconductive space or spacer. High energy density cells generally employ an organic solvent containing an inorganic salt as an electrolyte, and must be hermetically sealed to prevent ingress of moisture or egress of the solvent. The usual anodic material in these cells is lithium, while reducible materials, both elements and compounds, are used as cathode depolarizers.

A deficiency in button cells as conventionally made lies in the use of only one surface of each of the anode and cathode. Under steady drain conditions a current density is established on the basis of the useful electrode area. If the usable electrode area can be increased, the current density can be correspondingly decreased, which increases the life and utility of the cell.

In a button cell, assuming the anode to be in contact with the cell container, the cathode must be in conductive contact with the cell cap (which is itself insulated from the container) so that the cell can be used to furnish energy for a consuming device. It is possible to employ a contact strip attached to the cathode at one end and to the cell cap at the other end with suitable arrangements to insulate the contact from anode and cell container, but this method is extremely cumbersome, and surely not desirable for continuous, automated commercial production of cells.

The cells of this invention offer a simple solution to the problem of providing desirable current densities in high energy density galvanic cells of the button type.

SUMMARY OF THE INVENTION

In a generally flat relatively thin button type galvanic cell comprising a conductive container and a conductive top for the container insulated from the container, and within the container an anode electrode, a cathode electrode, a separator, and an electrolyte, the improvement comprising an electrode having two flat sides encased on both sides by a porous nonconductive separator and by the other electrode, the other electrode and the separator each containing at least one aperture in the same relative location through which contact is made between the encased electrode and either the container or top by means of at least one proturberance from the container or top, there being no contact between the container or top, the protuberance and the electrode through which the protuberance passes.

Improved button cells are provided by enfolding one electrode in a shaped fold of the second electrode. In this way the available electrode area is essentially doubled, allowing a lowering of the current density with improved life and utility of the cell. The enfolding electrode need not be a continuous surface but can consist of two halves enfolding the second electrode, the two halves being electrically connected by tabs or wires.

Button cells, while usually presented as circular in outline, are not limited to this shape. They can be square, rectangular or elliptical in shape, or indeed any shape suited to their intended use.

Either the anode or the cathode can be placed in the middle of an enfolding electrode of opposite polarity. Likewise, the protuberance(s) can be designed into the container itself or into the top for the container. The particular location(s) on the container or the top can vary as will be obvious to those skilled in the art.

The hole(s) in the enfolding electrode and in the separator must match up with the protuberance(s) so that there is no contact between the enfolding electrode and the protuberance(s). Of course, as will be readily appreciated, an insulator will be employed between the container or top bearing the protuberance(s) and the electrode through which the protuberance passes. Naturally the insulator will have appropriate openings for protuberance access to the enfolded electrode.

The cells of the invention can be hermetically sealed to prevent loss of organic electrolyte solvent or ingress of moisture. The body of the cell, and its top, must be made of conductive material, preferably metal, to provide outside contact for connecting the cell to an energy consuming device or to another cell, as in a battery. Cells of the invention can be assembled into batteries in any known manner. For example they can be stacked, the top of the cell contacting the bottom of the next cell, as desired to make a series connected battery, or they can be connected by other known devices.

BRIEF DESCRIPTION OF THE DRAWINGS

FIG. 1 represents one form in which a cell of the invention can be constructed. Numeral 1 represents the cell body or can, preferably made of conductive metal such as steel or aluminum; 2 represents the cell top of the same or a different conductive metal; 8 represents a deformation of said top; 3 represents a nonconductive L-shaped gasket which insulates 2 from 1 while 4 represents an essentially flat cathode; 5 represents a nonconductive U- or bag-shaped separator and 6 represents a U-shaped anode, enfolding cathode 4 with separator 5 therebetween; 7 represents an aperture in anode 6, through which protuberance 8A contacts cathode 4; and 9 represents a nonconductive insulator placed between top 2 and the top surface of anode 6.

FIGS. 2 through 8 show the various parts of a typical cell (different from the cell of FIG. 1) before assembly. FIG. 2 shows a plan view, and FIG. 2A shows a section view, of a container, 1. FIG. 3 shows a plan view, and FIG. 3A shows an end view, of a container top, 2, with metal protuberances 10 welded thereon. FIG. 4 shows a plan view, and FIG. 4A shows a section view, of a nonconductive generally rectangular L-shaped gasket, 3. FIG. 5 shows a plan view, and FIG. 5A shows an end view, of a flat cathode, 4.

FIG. 6 shows a plan view, and FIG. 6A shows an end view, of a nonconductive U-shaped separator, 5, before folding. FIG. 7 shows a plan view, and FIG. 7A shows an end view, of U-shaped anode, 6, before folding. FIG. 8 shows a plan view, and FIG. 8A shows an end view of insulator, 9. Cutout apertures 11, 12 and 13 shown in FIGS. 8, 6 and 7, respectively, are designed to allow passage of protuberances, 10, from container top, 2, of FIG. 3, to contact cathode, 4, of FIG. 5, without shorting the cell.

DETAILS OF THE INVENTION

Button cells of the invention are generally quite small, and provide a flat surface of about 4 square inches (one side) or less. They can be circular, elliptical, rectangular or any convenient shape. Their thickness is usually in the order of 50 to 200 mils, although thinner or thicker cells are possible. They are hermetically sealed by squeezing a plastic gasket between cell body and top. Conductive metals such as aluminum, stainless steel, tin coated steel or other materials are most practical for these cells.

The invention can be used with galvanic cells employing a wide variety of anodes, cathodes and electrolytes. The invention is illustrated herein with high energy density cells employing a light metal such as lithium or sodium as anode. As a separator between anode and cathode there can be used any nonconductive material easily penetrated by the liquid electrolyte. Paper, plastic or ceramic material can be used. As nonconductive insulator between anode and cell top there can be used any effective insulating material such as plastic or ceramic insulator.

Lithium is the preferred anode material although sodium and other light metals are also useful. Lithium is commercially available in ribbon form in high purity and can be handled more easily than sodium, for instance. In preparing high energy density cells, assembly and handling of lithium is best done in a dry atmosphere devoid of oxygen and nitrogen. Argon is a convenient material.

Broadly, the usable cathodes include depolarizers reducible by lithium metal. Any element or compound lower in the scale of reduction potential than lithium can be used as a cathode. Rapid progress in the field of electrical cells continually opens avenues for using new couple materials of high theoretical potential.

Representative of suitable cathode depolarizers are carbon fluoride and the oxides, fluorides, sulfides, phosphates, and chromates of metals such as iron, copper, nickel, silver, vanadium and tungsten. Of such suitable depolarizers one preferred sub-class includes the sulfides and fluorides of iron, copper and nickel and their mixtures. Representative of such compounds are $FeS_2$, $FeS$, $FeF_2$, $FeF_3$, $Cu_2S$, $CuS$, $CuF_2$, $CuF$, $NiS$, $Ni_7S_6$, and $NiF$. It will be appreciated that those cathode materials having the highest electrochemical capacity are more preferred, such as the sulfides $CuS$, $FeS$, $NiS$ and $Ni_7S_6$. Particularly preferred because of their high electrochemical utilization in batteries are cathode depolarizers consisting essentially of $CuS$.

Another preferred sub-class of suitable depolarizers includes $V_2O_5$, $Ag_3PO_4$, $Ag_2CrO_4$, carbon fluoride and $WO_3$. Of these, carbon fluoride, tungstic oxide and silver chromate are particularly preferred because of the higher inherent voltage which they afford in batteries.

Finished cathode depolarizers ready for use in batteries, can be prepared by a variety of means. For example, finished rigid iron sulfide cathode structures having greater than 70% FeS and some iron oxide are prepared by pressing a mixture of iron and sulfur powders (1:1 atom ratio) into a coherent structure and sintering the structure at 600°–650°C. for 10 to 30 minutes.

Finished copper sulfide cathodes containing more than 90% CuS are similarly prepared from a mixture of copper and sulfur powders pressed into a desired shape and cured at above the melting point of sulfur.

NiS and $Ni_7S_6$ suitable for pressing into finished cathode structures of desired shapes are prepared by sintering in an inert atmosphere a 1:1 atom ratio mixture of nickel and sulfur powders at about 600°C., grinding the resulting products and then pressing the pulverized material into a cathode structure of desired shape. X-ray diffraction analyses indicate that $Ni_7S_6$ is the major product with short periods of such sintering, say, up to 2.5 hours, while NiS is the major product of longer sintering, say, 16 hours. Thus, choice of sintering method provides materials consisting essentially of $Ni_7S_6$ of NiS.

Since the preferred sulfides are conductive they can be prepared in direct contact with current collector means without the addition of conductive materials to provide the cathode conductivity necessary for battery use. However, since the oxide, fluoride, phosphate and chromate depolarizers may have lower conductivity, the presence of a conductive additive is desirable before pressing them into finished cathode structures in contact with a current collector means. Performance of such cathodes is sometimes improved by the incorporation of minor amounts of a conductor such as carbon black. Usually 15% or less by weight of such conductor is utilized. Usually such depolarizers are pulverized, mixed with about 5 to 15% of carbon black based on the weight of the mixture and with about 1 to 15%, same weight basis, of a resin binder such as polytetrafluoroethylene powder. The powder mixtures are then pressed into a finished cathode structure containing from about 6 to 30% by weight of conductor and binder.

Cells of the invention can utilize nonaqueous electrolytes having conductivity of at least $1 \times 10^{-4}$ ohm$^{-1}$c-m$^{-1}$. Among the useful nonaqueous solvents are tetrahydrofuran, dimethyl carbonate, propylene carbonate, 1,3-dioxolane, 4-methyl-1,3-dioxolane, 1,2-dimethoxyethane, dimethylformamide, trimethyl carbamate, ethyl-N,N-dimethyl carbamate, the dimethyl ether of diethylene glycol, and various mixtures of these. Useful solutes include perchlorates, hexafluorophosphates, tetrafluoroborates, tetrachloroaluminates and hexafluoroarsenates or lithium, sodium, potassium, aluminum, magnesium calcium and beryllium.

A preferred electrolyte solvent is dioxolane or substituted dioxolane, having the formula

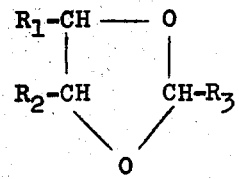

wherein $R_1$, $R_2$ and $R_3$ are the same or different and are hydrogen or alkyl of one to three carbon atoms, the total number of carbon atoms in $R_1$, $R_2$ and $R_3$ not exceeding six. More preferred electrolyte solvents are those in which $R_1$ and $R_3$ are hydrogen and $R_2$ is hydrogen or methyl. The most preferred solvent because of its highest performance is dioxolane, the compound in which $R_1$, $R_2$ and $R_3$ are hydrogen.

The electrolyte salt is present in sufficient concentration to provide a conductivity at 25°C. of at least $1 \times 10^{-4}$ ohm$^{-1}$cm$^{-1}$ and can be present in amounts ranging up to the saturation value. Usually it is preferred to avoid a saturated solution because upon cooling the battery, sufficient salt can precipitate to interfere with battery function. Therefore, preferred electrolytes ordinarily consist essentially of from about 5% to 30% by weight of salt and from about 95% to 70% by weight of solvent. A highly preferred combination consists essentially of about 10% by weight of $LiClO_4$ and about 90% by weight of dioxolane. The $LiClO_4$-dioxolane system is not only highly conductive but also essentially nonreactive with lithium metal.

It is sometimes advantageous to utilize in addition to a dioxolane as the primary solvent, a secondary solvent such as an aliphatic or cycloaliphatic carbohydric ether having a molecular weight no greater than about 165. Representative of such secondary solvents are cycloaliphatic carbohydric ethers other than dioxolane composed of carbon, hydrogen and oxygen and having 3–6 members including one oxygen atom or 2 non-adjacent oxygen atoms in the ring such as ethylene oxide, propylene oxide, butylene oxide, dioxane, tetrahydropyran, dihydrofurane, and tetrahydrofurane. Other such secondary solvents are aliphatic ethers characterized by the formula $RO-CH_2CH_2O-nR$ where $n$ is 0, 1 or 2, preferably where R is methyl or ethyl and $n$ is 1 or 2. Representative of such aliphatic ethers are diethyl ether, 1,2-dimethoxyethane, 1,2-diethoxyethane, the dimethyl ether of diethylene glycol and the diethyl ether of diethylene glycol. Preferred are the 1,2-dimethoxyethane and the dimethyl ether of diethylene glycol.

The secondary solvent reduces the amount of gas formed during discharge. The amount of such secondary solvent can range up to about a 1:1 weight ratio with the dioxolane. The concentration ranges for the salt in such binary solvent are the same as those for a dioxolane alone with about 10% by weight $LiClO_4$ and about 90% by weight of 1:2.5 binary solvent most preferred. Small amounts (up to about 25% by weight) of other solvents can also be used in the solvent mixture to promote the properties described above. Such solvents include methyl acetate, propylene carbonate, and dimethyl carbonate.

A tertiary nitrogen base such as dimethylisoxazole, pyridine or triethylamine can also be added to the electrolyte solvent in small amounts, normally less than 10% by weight, and preferably from about 0.1% by weight to 1% by weight, to suppress the tendency of the electrolyte system to form polymer and/or gas.

A large number of electrolyte salts are useful in the electrolytes. Such salts must have sufficient solubility and dissociation to provide conductivity of at least about $1 \times 10^{-4}$ ohm$^{-1}$cm$^{-1}$ in the electrolyte solution. Generally, the more useful salts are those with cations chosen from groups IA and IIA of the Periodic Table. The most useful salts are those wherein lithium, sodium, potassium, or tetraalkylammonium are the cations. In addition to simpe halogen salts many complex salts are useful, including tetrafluoroborates, hexafluorophosphates, hexafluoroarsenates, tetrachloroaluminates, and perchlorates, acetates, trifluoroacetates and trifluoromethanesulfonates. As indicated above, the most preferred salt is $LiClO_4$.

The following Example is meant to illustrate and is not meant to limit the invention.

EXAMPLE

Cans and lids for the cells were stamped from 14 mil thick stainless steel type 304. The cans were 1.7 inches long, 1 inch wide and 0.15 inch deep. The lids were of the same material and fit loosely inside the can. Separators for placement between cathode and anode surfaces were made of ceramic fiber cloth about 12 mils thick. Insulators for placement between the top anode surface and the lid were made of 3 mil polyethylene film. Insulating sealing rings having an L-shaped cross-section to be placed in the cans on top of the lower half of the separator were molded of polypropylene.

Cathodes were prepared by pressing copper sulfide in a mold. A stoichiometric mixture of electrolytic copper dust and sublimed sulfur was aged at room temperature in 60% relative humidity for 7 days. The powder was remixed and ground in a mortar once during the 7 day period. Between 3.6 and 3.7 grams of the mixture was pressed at 15,000 to 21,000 lbs. of force to provide cathodes 76 mils thick and 1.51 inches by 0.77 inch. The cathodes were then fired for 4 minutes by placing between 2 large metal plates heated to 235°C., then cooled in an argon atmosphere.

The further cell preparation and assembly were performed in a dry box in an argon atmosphere. Lithium anodes to be folded around cathode and separator were made from 15 mil lithium sheet. The hinged portion of the anode was bent around a small metal rod to an angle of about 60°.

Cell Assembly

With reference to FIGS. 2 to 8, the larger side of anode 6 was centered in the can 1 interior and pressed down firmly to form a conductive bond. The separator 5 was bent to correspond with anode 6 and placed next to the exposed side of said anode. Nonconductive L-shaped gasket 3, broad side down, was set in place on top of the lower half of separator 5. Cathode 4 was then set in place between the folds of separator 5, and the top halves of separator 5 and anode 6 were folded over cathode 4. Insulator 9 was then placed and aligned within the walls of nonconductive L-shaped gasket 3, and top 2 was firmly pressed into place with protuberances 10 extending through cutout portions 11, 12 and 13 to contact cathode 4.

The cell was filled with electrolyte by placing it (with others) in a sealable container which was evacuated to about 1 mm. Hg pressure. The container was then filled with the preferred electrolyte under the reduced pressure to a point above the top of the cells therein, completely filling the cells with electrolyte, and the vacuum released. Each cell was then removed and hermetically sealed by pressing the upstanding sides of can 1 over nonconductive L-shaped gasket 3. See FIG. 1, showing the crimped sides and gasket (by dash lines) of an analogous cell of this invention.

When assembled into batteries of 4 stacked cells of the above construction there were obtained from each battery from 6.0 to 7.0 watt hours of energy to a cut-off point of 6.0 volts at an average of about 13 milliamperes of current and 8 volts when discharged through 620 ohms resistance. A battery of this kind can be used to power small radios and other devices of similar electric power requirements.

Each cell delivered about 0.13 watt hours and 1 milliampere of current per gram of cell weight. In volume terms each cell furnished about 0.45 watt hour and 3.4 milliamperes of current per ml. of cell volume. Cells employing the same kind and weight of active materials but utilizing only one face of both anode and cathode provided only about 70% as much energy per unit of volume or weight.

I claim:

1. In a generally flat relatively thin button type galvanic cell comprising a conductive container and a conductive top for the container insulated from the container and at least one contact element from the container or top, and within the container an anode electrode, a cathode electrode, a separator between the electrodes, and an electrolyte, the improvement comprising
   a first electrode having two flat sides encased on both sides by a porous nonconductive separator and by a second electrode, the second electrode and the separator each containing at least one aperture in the same relative location through which contact is made between the encased electrode and either the container or top by means of said contact element, said contact element being a protuberance from the container or top, there being no contact between the protuberance and the electrode through which the protuberance passes.

2. A cell according to claim 1 having at least one protuberance from the container to the encased electrode, the encased electrode being the cathode.

3. A cell according to claim 1 having at least one protuberance from the container to the encased electrode, the encased electrode being the anode.

4. A cell according to claim 1 having at least one protuberance from the container top to the encased electrode, the encased electrode being the cathode.

5. A cell according to claim 1 having at least one protuberance from the container top to the encased electrode, the encased electrode being the anode.

6. A cell according to claim 1 wherein the anode is a light metal anode and the electrolyte is a nonaqueous electrolyte.

7. A cell according to claim 6 wherein the anode is lithium and the electrolyte is dioxolane.

8. A cell according to claim 7 wherein the cathode is CuS.

* * * * *